US012674883B2

(12) United States Patent
Schmidt

(10) Patent No.: US 12,674,883 B2
(45) Date of Patent: Jul. 7, 2026

(54) RADIO LOCATING SYSTEM, TRANSPONDER AND METHOD FOR OPERATING THE RADIO LOCATING SYSTEM

(71) Applicant: Siemens Aktiengesellschaft, Munich (DE)

(72) Inventor: Olga Schmidt, Langenleuba-Oberhain (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 19/105,874

(22) PCT Filed: Jul. 28, 2023

(86) PCT No.: PCT/EP2023/070967
§ 371 (c)(1),
(2) Date: Feb. 24, 2025

(87) PCT Pub. No.: WO2024/041842
PCT Pub. Date: Feb. 29, 2024

(65) Prior Publication Data
US 2026/0003067 A1 Jan. 1, 2026

(30) Foreign Application Priority Data
Aug. 26, 2022 (EP) ..................................... 22192372

(51) Int. Cl.
*G01S 13/87* (2006.01)
(52) U.S. Cl.
CPC .................................. *G01S 13/878* (2013.01)
(58) Field of Classification Search
CPC .................................................. G01S 13/878
See application file for complete search history.

(56) References Cited

U.S. PATENT DOCUMENTS 8,477,046 B2 * 7/2013 Alonso .................... H04Q 9/00
340/870.11
11,176,336 B2 11/2021 Hennig
(Continued)

FOREIGN PATENT DOCUMENTS

CN 114636968 6/2022
EP 2138861 12/2009
(Continued)

OTHER PUBLICATIONS

PCT International Search Report dated Sep. 21, 2023 based on PCT/EP202/070967 filed Jul. 28, 2023.

*Primary Examiner* — Timothy A Brainard
(74) *Attorney, Agent, or Firm* — Cozen O'Connor

(57) ABSTRACT

A radio locating system in which a position of a transponder is determined via base stations of the radio locating system based on radio signal receiving time differences or radio signal propagation times, wherein the transponder is arranged at a selected place on an object to be located, is equipped with a communication module for a wireless communication system and is operated as a base station or master station of the wireless communication system, where a display unit, which is equipped with a communication module and is separate from the transponder, connects to the transponder, the display unit being a subscriber or slave station of the wireless communication system, where the transponder transmits to the display unit position-related information and object-related data sent from the base stations of the radio locating system, and where the display unit displays the transmitted position-related information and object-related data in a continuously updated manner.

15 Claims, 3 Drawing Sheets

(56) References Cited

U.S. PATENT DOCUMENTS

| | | | |
|---|---|---|---|
| 2007/0075873 A1* | 4/2007 | Yang ..................... | G01S 5/0226 |
| | | | 340/8.1 |
| 2010/0201520 A1* | 8/2010 | Stern ..................... | G01S 13/878 |
| | | | 340/572.1 |
| 2011/0164657 A1 | 7/2011 | Coffland et al. | |
| 2014/0362120 A1 | 12/2014 | Wohl et al. | |

FOREIGN PATENT DOCUMENTS

| | | |
|---|---|---|
| EP | 3599573 | 1/2020 |
| KR | 20180070861 | 6/2018 |
| WO | 2022002503 | 1/2022 |

* cited by examiner

RADIO LOCATING SYSTEM, TRANSPONDER AND METHOD FOR OPERATING THE RADIO LOCATING SYSTEM

CROSS-REFERENCE TO RELATED APPLICATIONS

This is a U.S. national stage of application No. PCT/EP2023/070967 filed 28 Jul. 2023. Priority is claimed on European Application No. 22192372.5 filed 26 Aug. 2022, the content of which is incorporated herein by reference in its entirety.

BACKGROUND OF THE INVENTION

1. Field of the Invention

The present invention relates to a radio locating system, a transponder and a method for operating the radio locating system.

2. Field of the Invention

Radio-based locating apparatuses can be based on RFID tags (radio-frequency identification), for instance, which are each attached hereto to identify or locate objects. RFID tags comprise a storage unit, the contents of which can be read out, but also changed, via an RFID read device. Typically at least one identifier is stored in RFID tags in each case. In order to read out the information stored in RFID tags, RFID read devices each emit a query signal by generating an electromagnetic alternating field. On the one hand, this electromagnetic alternating field is used to particularly supply energy to passively operated RFID tags, which do not have a separate energy source. On the other hand, the electromagnetic alternating field is modulated by RFID tags to transmit a response signal, such as via load modulation or varying its antenna impedance.

Radio locating systems for industrial automation systems must satisfy particular requirements with respect to permissible data transmission, authenticity of transmitted data and insensitivity to sources of interference. Industrial automation systems are used to monitor, control and regulate technical processes, in particular in the field of manufacturing, process and building automation. Consequently, defective, manipulated or incorrectly configured radio locating systems may lead to serious consequences, in the most unfavorable case to a shutdown of an automation system.

EP 3 599 573 B1 relates to a method for transmitting data between a radio transponder read device and a radio transponder, in which a control unit of the radio transponder for generating a response signal controls a change in a load impedance by a control signal, which has a selected switching pulse frequency and a selected switching pulse number. The control unit encodes multivalued at least ternary symbols into the control signal. Symbol values are each assigned to switching pulse sequences, which each have a unique combination of switching pulse frequency, switching pulse number and phase shift. Here, only combinations are selected, the quotient of which comprising switching pulse number and switching pulse frequency lies within a predetermined value range.

WO 2022/002503 A1 discloses a radio locating system, in which a position of a transponder is determined via several base stations of the radio locating system using radio signal receiving time differences in a first operating mode or using radio signal propagation times in a second operating mode. In order to determine its position, the transponder sends a message to the base stations by broadcast. Base stations receiving the message each determine a receive signal intensity of a transponder signal used to transmit the message. An evaluation apparatus determines a number of base stations, which have received the transponder signal with a receive signal intensity lying above a predetermined minimum signal intensity, and moves the base stations accordingly into the first or into the second operating mode.

KR20180070861A relates to a position information terminal, which comprises a holder, on which at least one electronic shelf label is arranged, and a first communication unit arranged on the holder, which receives identification information from at least one electronic shelf label. Moreover, a control unit is provided for generating position information for the position information terminal. A second communication unit sends the identification information and the position information to a gateway. The second communication unit can be arranged in the holder or on a surface of the holder, for instance. At least one gateway or at least one server can therefore automatically receive the identification information from the electronic shelf label and register the identification information from at least one electronic shelf label.

Transponders of radio locating systems are each particularly attached to objects to be located, such as workpieces, robots or vehicles, and send locating signals at defined time intervals. Moreover, transponders can comprise e-ink or e-paper displays, on which position-, object- or process state-dependent information is displayed in a readable manner for humans or machines. By way of example, a reliable and efficient body tracking and processing can herewith be realized within an automobile manufacturing line. Vehicle bodies typically consist largely of metal. As such, transponders should only be arranged at suitable points on a vehicle body to keep radio signal attenuations as minimal as possible. On the other hand, the e-ink or e-paper display of a correspondingly equipped transponder should in particular always be easily readable via persons active in a manufacturing line.

SUMMARY OF THE INVENTION

It is an object of the present invention to provide a method for operating a radio locating system, which enables a favorable positioning of a transponder with respect to a radio signal propagation and an equally good readability of an associated display unit, and to provide an apparatus or device suited to implementing the method.

These and other objects and advantages are achieved in accordance with the invention by a radio locating system a transponder and a method in which a position of a transponder is determined via a plurality of base stations of a radio locating system using radio signal receiving time differences or using radio signal propagation times. Here, the base stations are each arranged at a predetermined position. The transponder is arranged at a selected point on an object to be located. Moreover, at least one identifier assigned to the object to be located is stored in the transponder and is transmitted to the base stations of the radio locating system when the position of the transponder is determined. Based on the identifier, object-related data assigned to the object to be located is sent to the transponder by the base stations of the radio locating system. Continuously updated object-related data is preferably transmitted to the transponder via the base stations of the radio locating system.

The position of the transponder can be determined, for instance, in accordance with the time difference of arrival (TDOA), where the base stations of the radio locating system are time-synchronized with one another. Basically, the position of the transponder can also be determined in accordance with two-way ranging (TWR). The radio locating system is preferably an at least RFID-based, ultra wide band (UWB) based or 2.4 GHz industrial, scientific, and medical (ISM) band-based real-time locating system (RTLS).

In accordance with the invention, the transponder is equipped with or includes a processor, memory and a communication module for a wireless communication system and is operated as a base station or master station of the wireless communication system. Moreover, at least one display unit equipped with a communication module and separated from the transponder is provided, which connects to the transponder as a subscriber station or slave station of the wireless communication system. The transponder transmits position-related information and the object-related data sent by the base stations of the radio locating system to the display unit, in particular via the wireless communication system. The display unit represents the transmitted position-related information and object-related data in a continuously updated manner.

With the present invention, the transponder can be positioned optimally on the object to be located for a transmission of radio locating signals. Accordingly, the display unit, in particular an e-paper display facility, can be arranged via its undocking so that relevant information can be read without difficulty and correctly by persons or automatic detection systems for a processing of the respective object within a manufacturing line. A number of display units can basically also be coupled to a transponder, for instance, via a locating manager, in order to be able to ensure a continuously faultless readability even with complicated use conditions. Moreover, battery-operated display units can be replaced in a simple and rapid manner by display units with charged batteries.

In accordance with a preferred embodiment of the present invention, the wireless communication system is a Wi-Fi communication system or a Bluetooth communication system. The transponder and the display unit can communicate with one another via a direct Wi-Fi connection, for instance. By contrast, the display unit advantageously communicates only indirectly, namely via the transponder with the base stations of the radio locating system. A communication within the radio locating system is therefore not disadvantageously influenced by display units.

The inventive radio locating system is provided to implement a method in accordance with disclosed embodiments, and comprises at least one transponder equipped with memory, a processor and a communication module for a wireless communication system that can be arranged at a selected point on an object to be located and can be operated as a base station or master station of the wireless communication system. Moreover, at least one display unit equipped with a communication module and separated from the transponder is provided and can be connected to the transponder as a subscriber station or slave station of the wireless communication system. Moreover, the radio locating system comprises a plurality of base stations that can be arranged at a predetermined position for detecting a position of the transponder using radio signal receiving time differences or using radio signal propagation times.

The transponder of the inventive radio locating system is configured to store at least one identifier assigned to the object to be located and to transmit the at least one identifier to the base stations of the radio locating system when the position of the transponder is determined. On the other hand, the base stations of the radio locating system of each transponder are configured to send the object-related data assigned to the object to be located to the transponder based on the identifier. Moreover, the transponder is configured to transmit position-related information and the object-related data sent by the base stations of the radio locating system to the display unit. Accordingly, the display unit is configured to display the transmitted position-related information and object-related data in a continuously updated manner.

The inventive transponder is provided to implement a method in accordance disclosed embodiments and is equipped with memory, a processor and a communication module for a wireless communication system. Moreover, the transponder can be arranged at a selected point on an object to be located and operated as a base station or master station of the wireless communication system. Moreover, the transponder is configured such that at least one display unit equipped with a communication module and separated from the transponder is connected to the transponder as a subscriber station or slave station of the wireless communication system.

Furthermore, the inventive transponder is configured so that a plurality of base stations each arranged at a predetermined position detect a position of the transponder using radio signal receiving time differences or using radio signal propagation times. In addition, the transponder is configured to store at least one identifier assigned to the object to be located and to transmit the at least one identifier to the base stations of the radio locating system when the position of the transponder is determined. Finally, the transponder is configured to transmit position-related information and object-related data sent by the base stations of the radio locating system, which are assigned to the object to be located based on the identifier, to the display unit for continuously updated representation.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is explained in more detail below in an exemplary embodiment using the drawing, in which.

DETAILED DESCRIPTION OF THE
EXEMPLARY EMBODIMENTS

Figure 1:
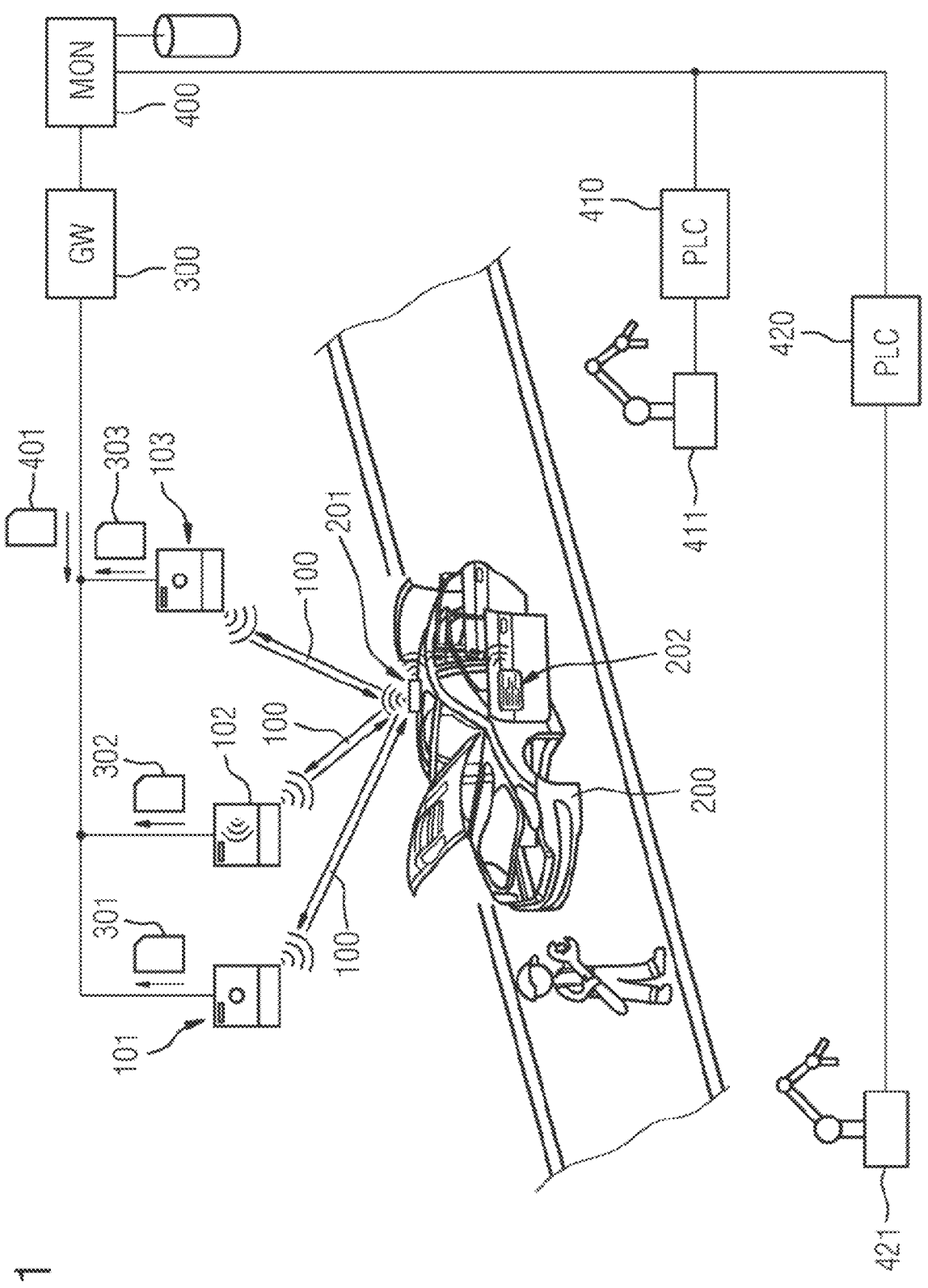
FIG. 1 shows a radio locating system for an industrial automation system with a plurality of base stations, a transponder and a display unit coupled to the transponder and arranged on an object to be located in accordance with the invention.

In the present exemplary embodiment, the radio locating system shown in FIG. 1 is a UWB or 2.4 GHz ISM band-based real-time locating system (RTLS), which comprises a plurality of base stations 101, 102, 103, which are each arranged at predetermined or known positions. A position of an RTLS transponder 201, which is arranged at a selected point on an object 200 to be located, is detected via the base stations 101, 102, 103 using radio signal propagation times or using radio signal receiving time differences. In the present exemplary embodiment, the object 200 to be located is a vehicle within a manufacturing line for vehicles. For an optimal exchange of locating signals 100 with the base stations, the RTLS transponder 201 is arranged on a roof of a vehicle body. Aside from UWB or 2.4 GHx ISM band components, the radio locating system can, for instance, comprise additional components for GPS, WLAN or inertial sensor-based locating. Here, a number of or all of these components can be integrated into the RTLS transponder 201 and into the base stations 101, 102, 103 of the radio locating system.

In the RTLS transponder 201, at least one object identifier assigned to the object 200 to be located is stored, which is transmitted to the base stations 101, 102, 103 of the radio locating system when the position of the RTLS transponder 201 is determined. In this way, the object 200 to be located, which is transported and mounted in the manufacturing line by robots 411, 421, for instance, can be monitored. The robots 411, 421 are each controlled by a programmable logic controller (PLC) 410, 420, which are connected to a central monitoring and control unit 400. In particular, the programmable logic controllers 411, 421 and the radio locating system can be configured or monitored via the monitoring and control unit 400.

The base stations 101, 102, 103 are connected to an evaluation apparatus, of the radio locating system, configured as a gateway 300. The base stations 101, 102, 103 preferably send datagrams 301, 302, 303, which comprise detected signal propagation time information, signal receiving time information, signal intensity measured values of received locating signals 100 or object identifiers, for evaluation to the gateway 300. For this purpose, in particular the positions of the base stations 101, 102, 103 of the radio locating system are present in the gateway 300 or in the monitoring and control unit 400.

In the present exemplary embodiment, the position of the RTLS transponder 201 is determined according to the time difference of arrival (TDOA). For this purpose, the base stations 101, 102, 103 are time-synchronized with one another. Alternatively, the position of the RTLS transponder 201, 202, 203 or a respective distance of the RTLS transponder 201 from the base stations 101, 102, 103 can be determined in accordance with two-way ranging (TWR). Details relating to position determination via TDOA are described for example in Wikipedia under multilateration.

By way of example, the gateway 300 can move the base stations 101, 102, 103 into a TDOA operating mode if at least 4 base stations have received a locating signal from the RTLS transponder 201 with the required minimum signal intensity. By contrast, the gateway 300 can move the base stations into a TWR operating mode if 3 base stations have received the locating signal from the RTLS transponder 201 with the required minimum signal intensity. In addition, the gateway 300 can use the knowledge about neighborly relationships between the base stations or about the positions of the base stations to decide on a switchover between the TDOA and the TWR operating mode.

The gateway 300 of the radio locating system sends the respectively determined position of the RTLS transponder 201 including the object identifier to the monitoring and control unit 400. By way of example, the monitoring and control unit 400 can validate locating information assigned to the RTLS transponder 201 in the monitoring and control unit 400 using the position of the RTLS transponder 201 sent by the gateway 300. Furthermore, object-related data 401 assigned to the object to be located is sent to the RTLS transponder 201 by the base stations 102-103 of the radio locating system based on the object identifier. This object-related data 401 is advantageously provided by the monitoring and control unit 400. Continuously updated object-related data 401 is preferably transmitted to the RTLS transponder 201 by the base stations 101, 102, 103 of the radio locating system.

The RTLS transponder 201 is equipped with a communication module for a wireless communication system and is operated as a base station or master station of the wireless communication system. The wireless communication system can be in particular a Wi-Fi communication system or a Bluetooth communication system.

In addition, at least one display unit 202 equipped with a communication module and separated from the RTLS transponder 201 is provided, which connects to the RTLS transponder 201 as a subscriber station or slave station of the wireless communication system. The display unit 202 is preferably configured as an e-paper display facility and only communicates indirectly, i.e., via the RTLS transponder 201, with the base stations 101, 102, 103 of the radio locating system.

In the exemplary embodiment shown in FIG. 1, the display unit 202 is fastened to a vehicle door, so that persons active in the manufacturing line can read information shown on the display unit 202 without difficulty or detect the information via scanners. Basically, the display unit 202 could also be arranged at different points on the vehicle body, at which a good visibility for the persons active in the manufacturing line is given.

The RTLS transponder 201 transmits position-related information and the object-related data 401 sent by the base stations 101, 102, 103 of the radio locating system via the wireless communication system to the display unit 202. Here, the RTLS transponder 201 and the display unit 202 preferably communicate with one another via a Wi-Fi direct connection. The display unit 202 represents the transmitted position-related information and object-related data in a continuously updated manner.

Figure 2:
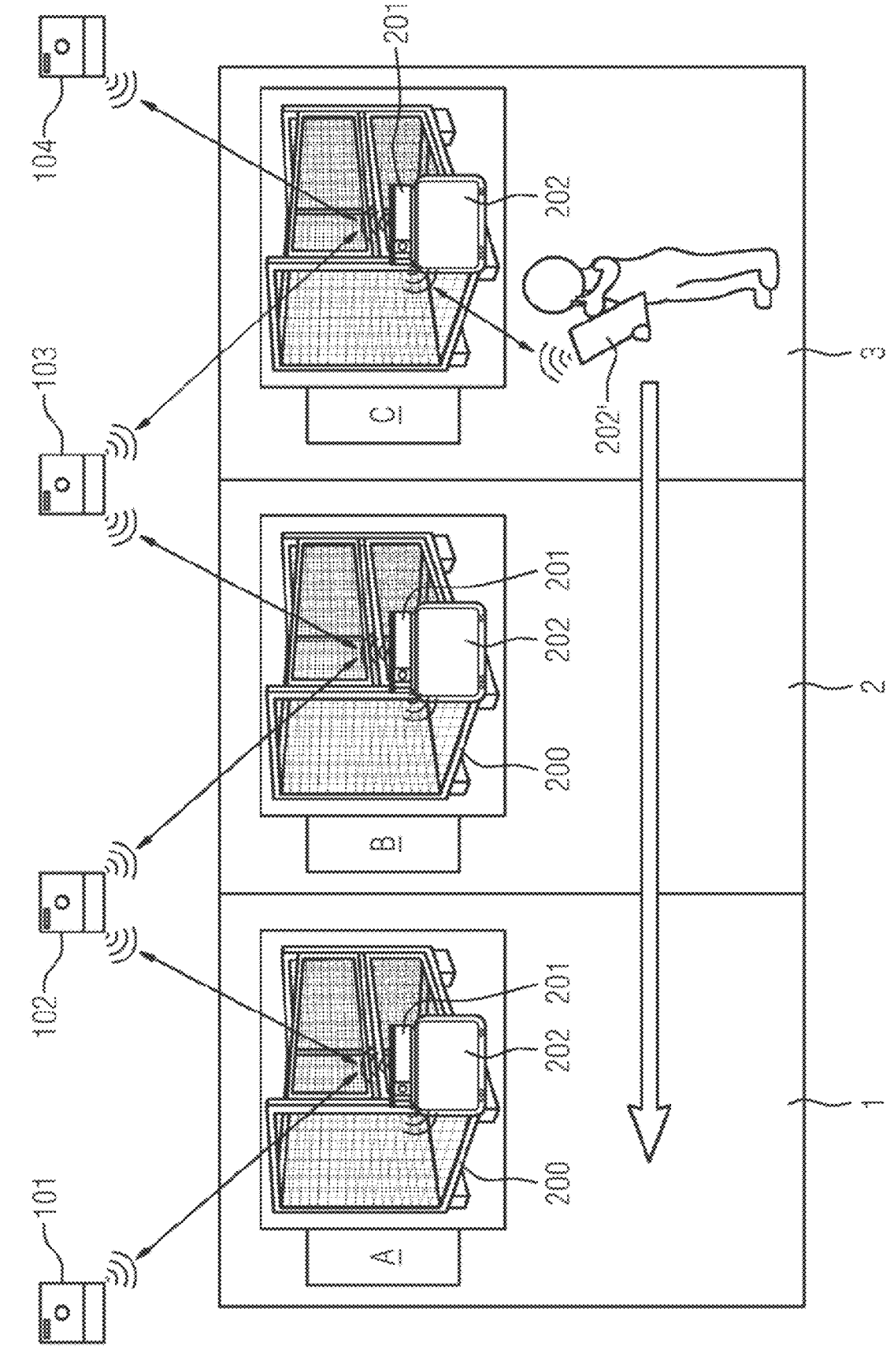
FIG. 2 shows a radio locating system with a plurality of base stations, a transponder and a portable display unit in accordance with the invention.

With the exemplary embodiment shown in FIG. 2, a portable display unit 202' that can be configured as a tablet, for instance, is used in addition to display units 202 fastened to the objects 200 to be located. In this exemplary embodiment, the objects 200 to be located are received in containers arranged in several regions 1, 2, 3, in particular storage regions, where the containers receive the material or production products. RTLS transponders 201 that can be located, as previously described, by base stations 101, 102, 103, 104 of a radio locating system, are each fastened to these containers 200.

If a person passes through the regions 1-3, then their portable display unit 202' connects via a communication link of a wireless communication system similar to the above configurations with the RTLS transponder 201 of the container 200 located in the respective region 1, 2, 3. Position-related information and object-related data can therefore be displayed in the respective region 1, 2, 3 on the portable display unit 202' in addition to a display on the display units 202 fastened to the containers 200. This position-related information and object-related data particularly comprise in the present exemplary embodiment a specification of the respective region 1, 2, 3 and a list of a respective container content. The display units 202 fastened to the respective container 200 can basically also be connected to the RTLS transponder 201 there via a wired connection. It is essential that a communication occurs between the portable display unit 202' and the RTLS transponders via a wireless communication system, for which the RTLS transponders 201 are operated as base or master stations.

Figure 3:
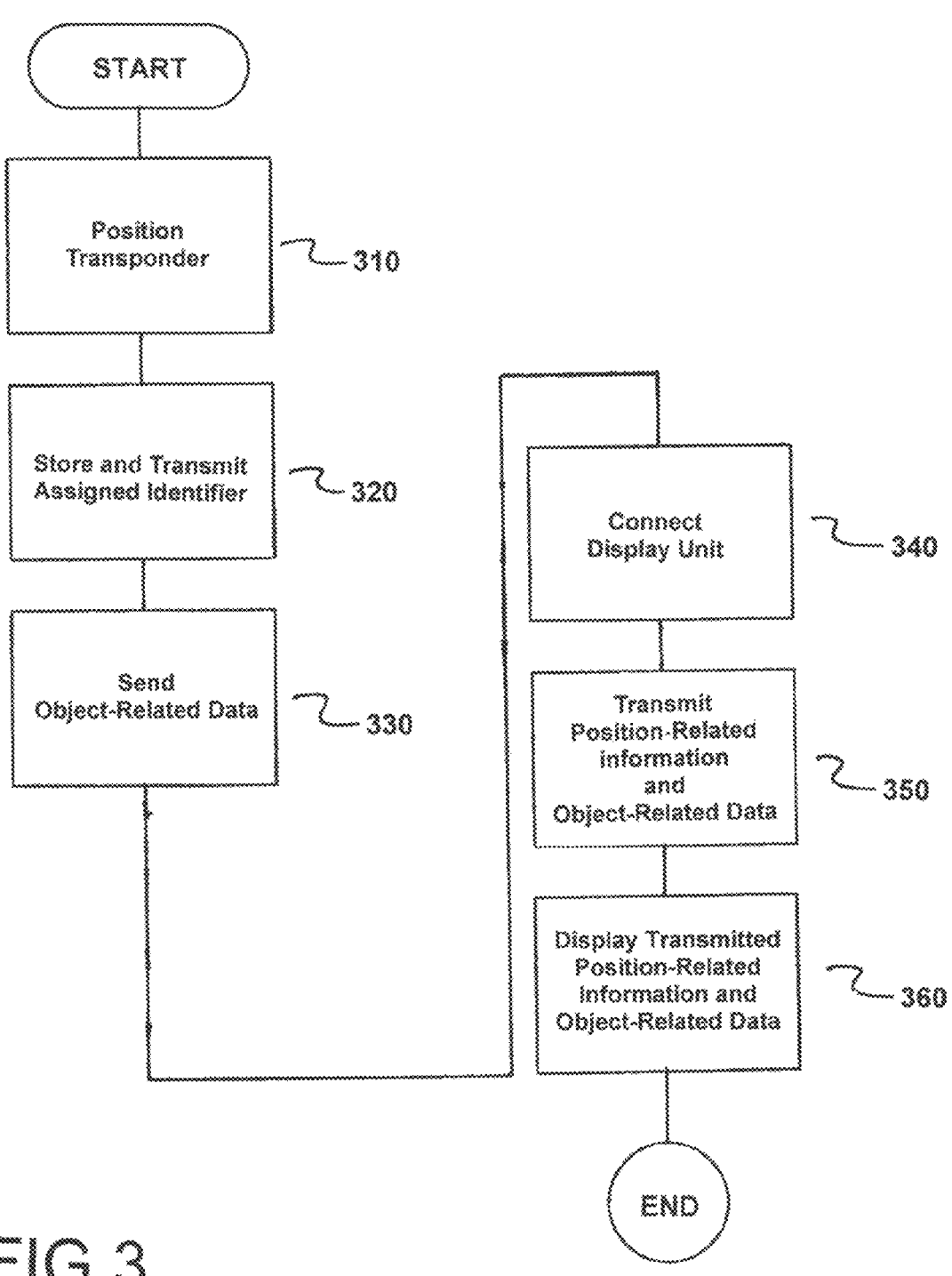
FIG. 3 is a flowchart of the method in accordance with the invention.

FIG. 3 is a flowchart of the method for operating a radio locating system, in which a position of a transponder 201 is determined via a plurality of base stations 101, 102, 103 of the radio locating system using radio signal receiving time differences and/or radio signal propagation times, where the base stations are arranged at a predetermined position in each case.

The method comprises arranging the transponder at a selected point on an object 200 to be located, as indicated in step 310.

Next, at least one identifier assigned to the object to be located is stored in the transponder and the at least one identifier is transmitted to the plurality of base stations of the radio locating system when the position of the transponder is determined, as indicated in step 320.

Next, based on the identifier, object-related data 401 assigned to the object to be located is sent to the transponder via the plurality of base stations of the radio locating system, as indicated in step 330. In accordance with the method, the transponder is equipped with a communication module for a wireless communication system and is operated as a base station or master station of the wireless communication system.

Next, at least one display unit 202 equipped with a communication module and separated from the transponder is connected to the transponder as a subscriber station or slave station of the wireless communication system, as indicated in step 340.

Next, the transponder transmits position-related information and the object-related data sent by the plurality of base stations of the radio locating system to the display unit, as indicated in step 350.

The display unit now displays the transmitted position-related information and object-related data in a continuously updated manner, as indicated in step 360.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps that perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for operating a radio locating system, in which a position of a transponder is determined via a plurality of base stations of the radio locating system utilizing at least one of radio signal receiving time differences and radio signal propagation times, the base stations being arranged at a predetermined position in each case, the method comprising:

arranging the transponder at a selected point on an object to be located;

storing at least one identifier assigned to the object to be located in the transponder and transmitting the at least one identifier to the plurality of base stations of the radio locating system when the position of the transponder is determined;

sending, based on the identifier, object-related data assigned to the object to be located to the transponder via the plurality of base stations of the radio locating system, the transponder being equipped with a communication module for a wireless communication system and being operated as a base station or master station of the wireless communication system;

connecting at least one display unit equipped with a communication module and separated from the transponder to the transponder as a subscriber station or slave station of the wireless communication system;

transmitting by the transponder position-related information and the object-related data sent by the plurality of base stations of the radio locating system to the display unit;

displaying by the display unit the transmitted position-related information and object-related data in a continuously updated manner.

2. The method as claimed in claim 1, wherein the position of the transponder is determined in accordance with the time difference of arrival; and wherein the base stations of the radio locating system are time-synchronized with one another.

3. The method as claimed in claim 2, wherein the position of the transponder is determined in accordance with two-way ranging.

4. The method as claimed in claim 1, wherein the radio locating system is an at least RFID-based, Ultra wideband based and/or 2.4 GHz industrial, scientific, and medical band-based real-time locating system.

5. The method as claimed in claim 1, wherein the position of the transponder is determined in accordance with two-way ranging.

6. The method as claimed in claim 1, wherein the radio locating system is an at least RFID-based, UWB-based and/or 2.4 GHz industrial, scientific, and medical band-based real-time locating system.

7. The method as claimed in claim 1, wherein the radio locating system is an at least RFID-based, Ultra wideband based and/or 2.4 GHz industrial, scientific, and medical band-based real-time locating system.

8. The method as claimed in claim 1, wherein the wireless communication system is one of a Wi-Fi communication system and a Bluetooth communication system.

9. The method as claimed in claim 8, wherein the transponder and the display unit communicate with one another over a Wi-Fi direct connection.

10. The method as claimed in claim 1, wherein the transponder transmits the position-related information and the object-related data via the wireless communication system to the display unit.

11. The method as claimed in claim 1, wherein continuously updated object-related data is transmitted to the transponder via the plurality of base stations of the radio locating system.

12. The method as claimed in claim 1, wherein the display unit is an e-paper display facility.

13. The method as claimed in claim 1, wherein the display unit only communicates indirectly with the plurality of base stations of the radio locating system via the transponder.

14. A radio locating system comprising:

at least one transponder which is equipped with a communication module for a wireless communication system, said at least one transponder being arrangeable at a selected point on an object to be located and being operable as a base station or master station of the wireless communication system;

at least one display unit which is equipped with a communication module and separated from the transponder, the at least one display unit being connectable to the at least one transponder as a subscriber station or slave station of the wireless communication system; and a plurality of base stations which are each arrangeable at a predetermined position for detecting a position of the at least one transponder utilizing at least one of radio signal receiving time differences and radio signal propagation times;

wherein the at least one transponder is configured to store at least one identifier assigned to the object to be located and to transmit the at least one identifier to the plurality of base stations of the radio locating system when the position of the transponder is determined;

wherein the plurality of base stations of the radio locating system are configured to send object-related data assigned to the object to be located to the transponder based on the identifier;

wherein the transponder is further configured to transmit position-related information and the object-related data sent by the base stations of the radio locating system to the display unit; and wherein the display unit is configured to display the transmitted position-related information and object-related data in a continuously updated manner.

15. A transponder comprising:

a communication module for a wireless communication system;

wherein the transponder is arrangeable on a selected point of an object to be located and is operatable as a base station or master station of the wireless communication system;

wherein the transponder is configured such that at least one display unit equipped with a communication module and separated from the transponder is connected to the transponder as a subscriber station or slave station of the wireless communication system;

wherein the transponder is further configured such that a plurality of base stations arranged at a predetermined position detect a position of the transponder utilizing at least one of radio signal receiving time differences and radio signal propagation times;

wherein the transponder is further configured to store at least one identifier assigned to the object to be located and to transmit the at least one identifier to the plurality of base stations of the radio locating system when the position of the transponder is determined;

wherein the transponder is further configured to transmit position-related information and object-related data sent by the base stations of the radio locating system, which are assigned to the object to be located based on the identifier, to the display unit for continuously updated representation.

* * * * *